(12) United States Patent
Gagliardi

(10) Patent No.: US 7,501,576 B2
(45) Date of Patent: Mar. 10, 2009

(54) CEILING RACEWAY

(76) Inventor: Thomas P. Gagliardi, 2414 75th St., Kenosha, WI (US) 53143

( * ) Notice: Subject to any disclaimer, the term of this patent is extended or adjusted under 35 U.S.C. 154(b) by 0 days.

(21) Appl. No.: 11/811,724

(22) Filed: Jun. 12, 2007

(65) Prior Publication Data
US 2008/0308317 A1 Dec. 18, 2008

(51) Int. Cl.
H02G 3/04 (2006.01)
(52) U.S. Cl. .................. 174/72 A; 174/72 C; 174/135; 174/95; 174/68.1; 174/101; 248/49; 52/220.1; 138/107
(58) Field of Classification Search ............... 174/72 A, 174/72 C, 68.1, 68.3, 95–97, 100, 101, 135, 174/48; 248/49; 138/107, 162; 52/220.1, 52/220.5
See application file for complete search history.

(56) References Cited

U.S. PATENT DOCUMENTS

| | | | |
|---|---|---|---|
| 3,649,741 A | 3/1972 | Fremont | |
| 3,699,235 A | 10/1972 | Wasson et al. | |
| 3,710,530 A | 1/1973 | Valtonen | |
| 3,725,568 A | 4/1973 | Stanley | |
| 3,786,171 A | 1/1974 | Shira | |
| 3,836,936 A | 9/1974 | Clement | |
| 3,915,420 A | 10/1975 | Norris | |
| 3,919,457 A | 11/1975 | Steiner | |
| 4,101,103 A | 7/1978 | Mooney et al. | |
| 4,534,147 A | 8/1985 | Cristell | |
| 5,024,614 A * | 6/1991 | Dola et al. | 439/114 |
| 5,271,585 A | 12/1993 | Zetena, Jr. | |
| 5,842,313 A | 12/1998 | Murray et al. | |
| 6,029,713 A | 2/2000 | Miranda | |
| 6,112,483 A | 9/2000 | Murray et al. | |
| 6,252,171 B1 | 6/2001 | Barr | |
| 6,254,041 B1 | 7/2001 | Dufourg | |
| 6,348,660 B1 * | 2/2002 | Gutgsell et al. | 174/68.3 |
| 6,515,224 B1 | 2/2003 | Pedro | |
| 6,565,048 B1 | 5/2003 | Meyer | |
| 6,631,875 B1 | 10/2003 | Kampf et al. | |
| 6,911,597 B2 | 6/2005 | Seamans et al. | |
| 7,163,410 B2 | 1/2007 | Isaacks | |
| 7,304,240 B1 * | 12/2007 | Gretz | 174/72 A |
| 2002/0100235 A1 | 8/2002 | Weiss | |
| 2004/0104322 A1 | 6/2004 | Hennequin | |
| 2004/0124321 A1 | 7/2004 | Kampf et al. | |

* cited by examiner

*Primary Examiner*—Dhiru R Patel
(74) *Attorney, Agent, or Firm*—Brooks, Cameron & Huebsch, PLLC

(57) ABSTRACT

Among various embodiments of the present disclosure, a ceiling raceway can be formed with an enclosable compartment for a number of cables locatable above a lower surface of a drop ceiling. The enclosable compartment can have a bottom hinged surface that is openable to enable access to an interior of the enclosable compartment. A flange can extend coplanar with the bottom hinged surface in a closed position to support a section of the drop ceiling such that the section is substantially flush with the bottom hinged surface in the closed position.

23 Claims, 12 Drawing Sheets

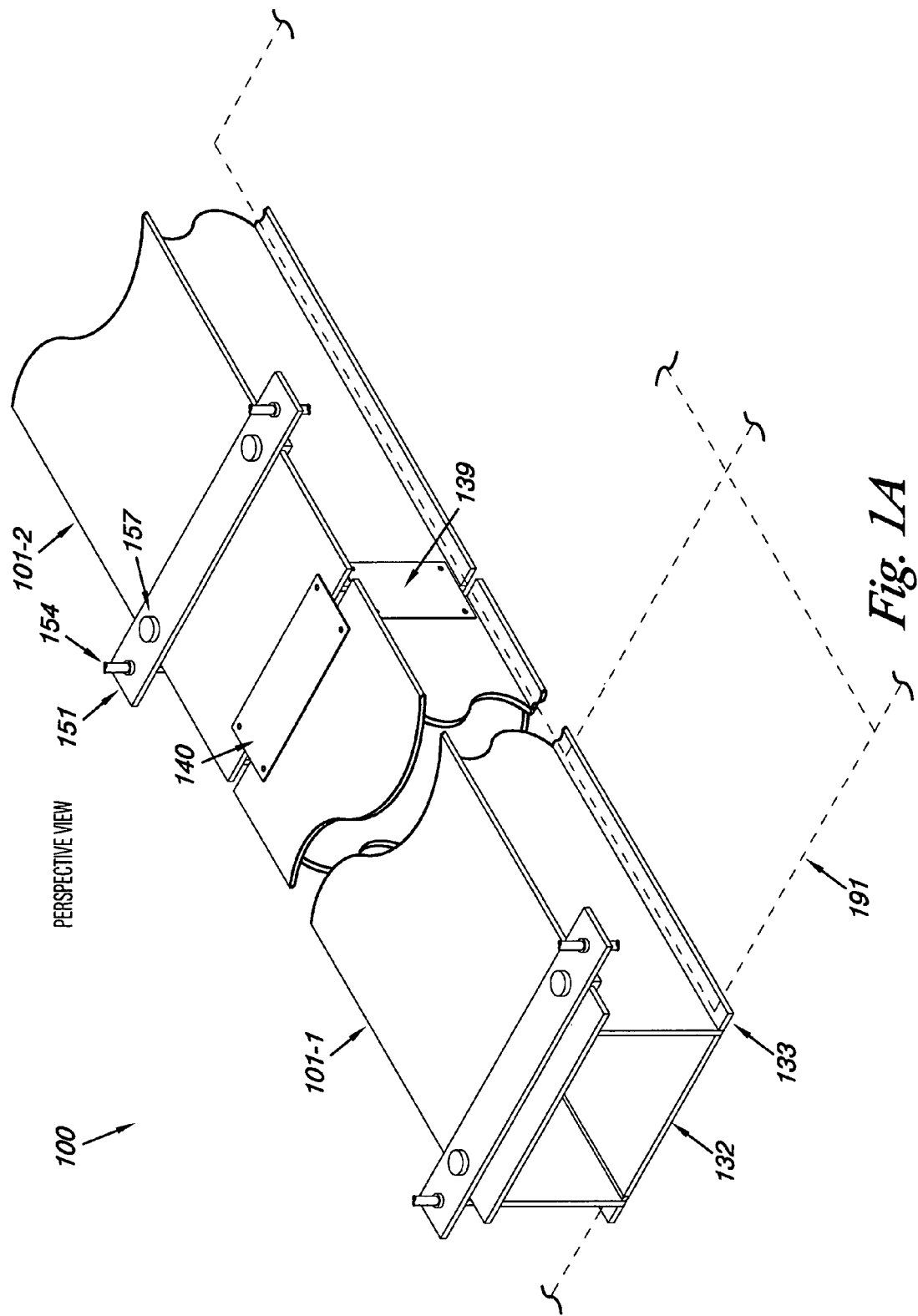

500 ANGLED UNIVERSAL COUPLING 510 3 - WAY COUPLING 520 4 - WAY COUPLING

# CEILING RACEWAY

INTRODUCTION

Installation of cables between a solid ceiling structure (e.g., constructed from materials such as masonry, wood, spancrete, and metal, among others) and a drop ceiling can provide connections for low voltage electrical power, electronic signals, and the like. During construction of a building having one or more rooms that provide a particular service and/or that is used for a particular industry, during finishing of the interior thereof, and/or during installation of additional components therein, low voltage cabling can be placed above sections of a drop ceiling to unobtrusively position a majority of such cabling. In some situations, the cabling can be laid out above the sections of the drop ceiling such that the cables are supported by the drop ceiling sections, the cabling and/or a conduit for the cabling can be suspended from the ceiling or other overhead structure with hangers directly or indirectly attached thereto, and the like. However, placement of cables as just described can have a number of disadvantages.

Among the potential drawbacks are awkwardness and difficulties encountered in initially installing the cables in a desired position or pattern above the drop ceiling due to moving sections of the drop ceiling out of the way and working around the support structure for the sections of the drop ceiling. Such installation may require the services of two or more persons to enable positioning and securing the cables as desired. In addition, placement as described above can introduce difficulties in accessing the cabling for servicing and/or adaptation to changes/additions in equipment supplied by such cables. Moreover, placement of cables in an unordered arrangement between the solid ceiling and the drop ceiling can compromise insulation between different cables, thereby contributing to unreliable performance of equipment connected to the cables, hazards resulting from short circuiting, and the like.

BRIEF DESCRIPTION OF THE DRAWINGS

FIG. 1A illustrates an example of a perspective view of a ceiling raceway system according to an embodiment of the present disclosure.

DETAILED DESCRIPTION

Figure 1B:
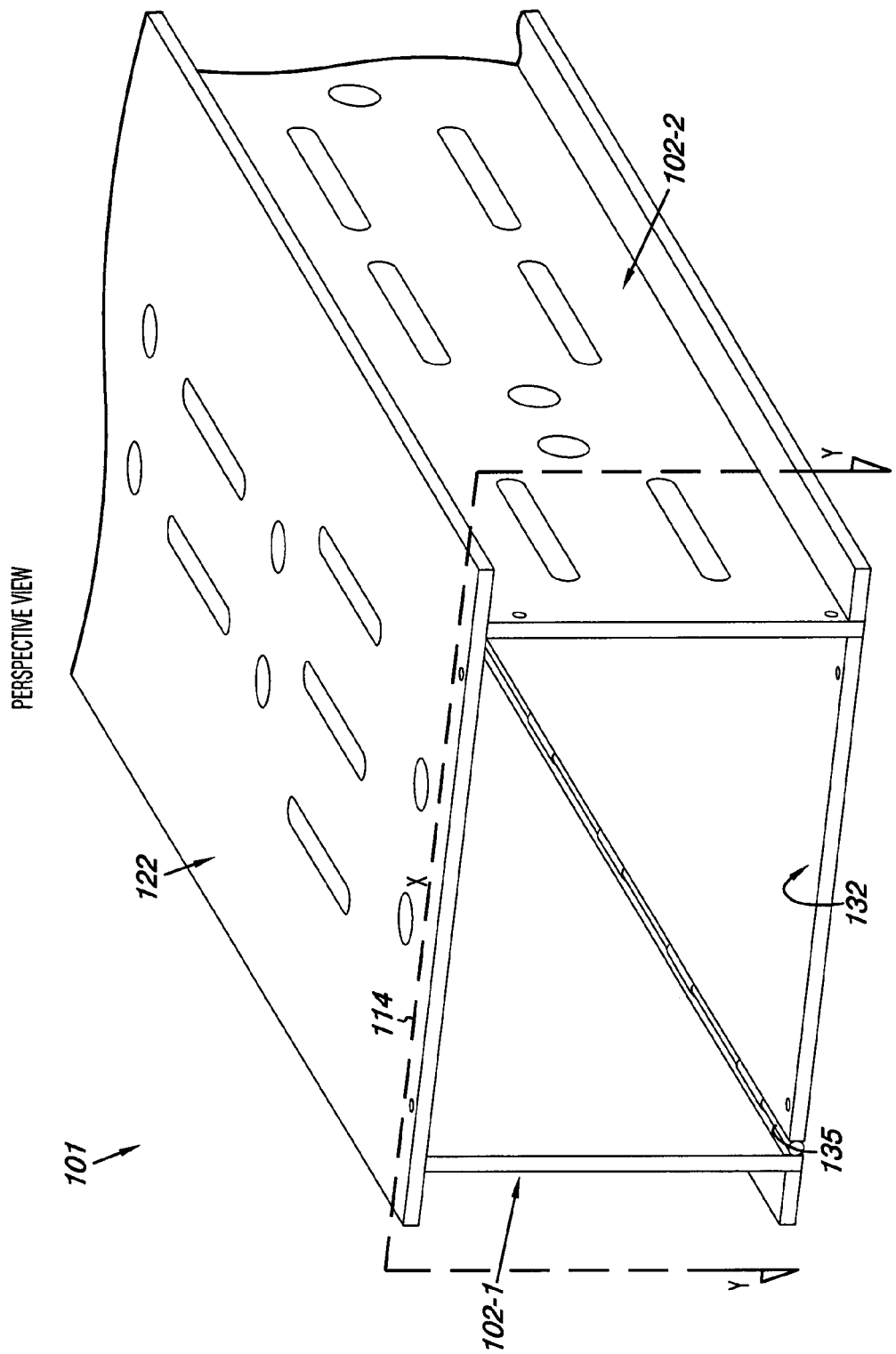
FIGS. 1B-1E illustrate an example of an enclosable compartment of a ceiling raceway shown from various viewpoints according to an embodiment of the present disclosure.

A number of concerns can arise when installing and/or servicing cables conducting low voltage electrical power, electronic signals, and the like, when such cables are located above a drop ceiling. Personnel engaged in original placement and positioning of the cables above the drop ceiling, in addition, modification and/or removal of such cables, in connecting segments of cables or cables to equipment feeds, among other situations, can experience difficulties for various reasons. For instance, such difficulties can include the awkwardness of moving multiple sections (e.g., sections 1-3 square feet in size) of the drop ceiling and working around the support structure for the multiple sections (e.g., a hanging grid for the sections 1-3 square feet in size). As such, the sections of the drop ceiling and the support structure can contribute to complications in installation of and access to the cables and couplings installed above a drop ceiling not implementing embodiments of the present disclosure.

Among other possible concerns are the adequacies of area, volume, and/or fittings above a drop ceiling for handling a number of cables intended for use in the particular service and/or industry. Allowing sufficient flexibility for the installation personnel and/or the user to utilize desired types and positioning of the various system components, conduits, angled connections, and the like, can be concerns for efficiently distributing the cables, protecting the cables from possible damage/malfunction, and/or handling increasing numbers of cables.

Accordingly, among various embodiments of the present disclosure, a cable raceway system can be formed by attaching to fixed rods, formed in a ceiling structure (e.g., constructed from materials such as masonry, wood, spancrete, and metal, among others) above a drop ceiling, a mounting plate above an upper surface of the drop ceiling. In some embodiments, the fixed rods can be threaded for adjustable mounting locks for adjustably attaching the mounting plate to the fixed rods projecting from either the ceiling structure located above the mounting plate. In some situations, a ceiling structure can be part of a floor structure, for example, when a number of rooms, workspaces, etc., are vertically arranged in a building. As such, in the present disclosure, the terms floor and ceiling can be used interchangeably when referring to a solid structure located above the drop ceiling. In various embodiments, the mounting plate can have two receiving tracks pending from the mounting plate. An enclosable compartment can be connected to the mounting plate, where the enclosable compartment can have a top surface, a bottom hinged surface, and two side surfaces for housing a number of cables.

The bottom hinged surface of the enclosable compartment can have a first set of two flanges that extend beyond the two side surfaces, with the first set of two flanges being coplanar with the bottom hinged surface in a closed position and with the bottom hinged surface being configured to be substantially flush, when in the closed position, with the lower surface of the drop ceiling. The top surface of the enclosable compartment can have a second set of two flanges that extend beyond the two side surfaces, with the second set of two flanges being coplanar with the top surface and with the second set of two flanges of the top surface being configured to channel within the two receiving tracks of the mounting plate.

FIG. 1A illustrates an example of a perspective view of a ceiling raceway system according to an embodiment of the present disclosure. The embodiment illustrated in FIG. 1A shows a ceiling raceway system 100 that includes an example of a portion of two coupled sections 101-1, 101-2 of enclosable compartments that can be used in the ceiling raceway system 100. The portion of the two coupled sections 101-1, 101-2 is illustrated as an integrated overview of components individually described below in further detail with reference to numbered elements in the following figures. As such, some individual components of the two coupled sections 101-1, 101-2 are not numbered.

In various embodiments, a ceiling raceway system, and associated parts thereof, can be formulated from any suitable material. In some embodiments, the ceiling raceway system 100 can be formulated largely from metal (e.g., aluminum, zinc, etc.) to enhance strength and rigidity, meet building codes, and be fire resistant, among other reasons.

FIG. 1A illustrates a portion of two coupled sections, however, a system consistent with the present disclosure can include an unlimited number of sections of enclosable compartments to form a ceiling raceway coupled with any combination of the, for example, couplings 139, 140 and/or connections, as described in further detail below. Embodiments of ceiling raceways in accordance with the present disclosure can be utilized in buildings having a variety of configurations, which can include, for example, multistory structures, single-level structures with a single workspace, and single-level structures divided into multiple workspaces, among other building configurations. Embodiments of the ceiling raceways may be particularly suitable for the single-level structure divided into multiple workspaces because sections of the ceiling raceway can be coupled in a plane above the drop ceilings of each workspace. As such, the coupled sections can be integrated into a substantially two dimensional network having unlimited dimensional lengths of the ceiling raceway and an unlimited number of branches of the ceiling raceway (e.g., extending from a trunk of ceiling raceway running along a centrally located hallway/corridor) providing cabling, for example, to each of the workspaces.

Individual sections of the enclosable compartments, along with the associated coupling/connections, can have a variety of lengths, heights, and/or widths suitable for installation in various space configurations above drop ceilings. By way of example and not by way of limitation, a section of enclosable compartment can, in some embodiments, have a length from around four feet to around ten feet. In various embodiments, a height and/or width of the enclosable compartment can vary in proportion to the length or remain fixed relative to other sections of enclosable compartments in the system.

The embodiment of the ceiling raceway system 100 illustrated in FIG. 1A shows a planar component 151 of a mounting plate adjustably attached to a fixed rod 154 projecting, for example, from a floor structure located above the mounting plate, as described in further detail with reference to FIG. 7. A lock set screw 157 projecting through an aperture can be used in combination with a receiving track, as described in detail below, to enable securing a section of the ceiling raceway (e.g., section 101-2) to the planar component 151 of the mounting plate. The adjustable attachment to the fixed rod 151 can enable securing the planar component 151 of the mounting plate, and by extension the ceiling raceway system 100, to the floor structure located above the mounting plate.

In some embodiments, a section of an enclosable compartment can have a length of around eight feet. The length of eight feet can be selected by a user and/or installation personnel for reasons that include having a length short enough to facilitate transport to, and handling at, an installation site (e.g., fitting within an elevator, not requiring more than two people, etc.) in combination with being long enough to allow installation of relatively few sections to achieve a desired total length of a ceiling raceway system. Installing fewer sections of the ceiling raceway system can contribute to reducing labor and material costs. For example, installing a larger number of short sections can increase costs by requiring more mounting plates, couplings, etc, along with increased labor associated with connecting the sections to each other and to the floor structure located above the ceiling raceway system. In some embodiments, an enclosable compartment can have a width of around four inches to eight inches to allow installation of a preferred number of cables.

In various embodiments, the sections 101-1, 101-2 of the enclosable compartments illustrated in FIG. 1A can include a bottom hinged surface 132 with a flange 133 extending coplanar from the bottom hinged surface 132 beyond a side surface, as described in detail below. Opening the bottom hinged surface 132 can enable access to an interior of an enclosable compartment to, for example, facilitate placement and positioning of cables above a drop ceiling, in addition, modification and/or removal of such cables, in connecting segments of cables or cables to equipment feeds, among other functions associated with the interior.

The embodiment of the portion of two coupled sections 101-1, 101-2 of the ceiling raceway system 100 illustrated in FIG. 1A shows that a drop ceiling 191 indicated by dotted lines can be at least partially supported by one or more flanges, for example flange 133, extending from bottom surfaces of one or more sections 101-1, 101-2 of enclosable compartments extending beyond the side surfaces, with the flanges being substantially coplanar with the bottom surface. The dotted lines of the drop ceiling 191 indicate that the drop ceiling 191 can, in various embodiments, be formed using a number of sections (e.g., tiles) of drop ceiling material, which can, in various embodiments, form squares, rectangles, and other suitable shapes, depending on the situation.

A lower face of the bottom hinged surface of a ceiling raceway can, in various embodiments, be finished to conform aesthetically and/or functionally with characteristics of material of an associated and at least partially supported drop ceiling. For example, the lower face of the bottom hinged surface can be painted, coated, and/or textured, among other possibilities, to aesthetically match or contrast with characteristics of drop ceiling tiles in the same workspace. In some embodiments, the particular characteristics of the lower face of the bottom hinged surface can be selected to conform to characteristics of drop ceilings in individual workspaces, which can vary depending upon the activities conducted therein. In some embodiments, visually apparent characteristics of the side and top surfaces of the ceiling raceway can be selected so as to differ from, for example, a common industrial color such as battleship gray.

FIGS. 1B-1E illustrate an example of an enclosable compartment of a ceiling raceway shown from various viewpoints according to an embodiment of the present disclosure. The embodiment illustrated in FIG. 1B shows a perspective view that includes a portion of a complete section of an enclosable compartment 101 that can, in various embodiments, be connected to a number of other sections of enclosable compartments, various types of couplings, end caps, mounting plates, among other components, to form a ceiling raceway system.

The perspective view of the embodiment illustrated in FIG. 1B shows the enclosable compartment 101 as including the two side surfaces 102-1, 102-2, the top surface 122, and the bottom hinged surface 132. A hinge device 135 can pivotably connect the bottom hinged surface 132 with a side surface of the enclosable compartment 101 (e.g., side surface 102-1).

The cut line 114 can represent a sectioning of the enclosable compartment 101 that is perpendicular in an X direction to a side edge of the top surface 122 and perpendicular in a Y direction to the plane of the top surface 122. A cut line such as cut line 114 can, for example, be used in illustrating an end view of an enclosable compartment (e.g., see FIG. 2) and/or an end view of a ceiling raceway system (e.g., see FIG. 7).

As will be appreciated by one of ordinary skill in the art, a number of hinge device configurations can be utilized to accomplish the objectives described and/or illustrated herein and representations of particular hinge devices are presented by way of example and not by way of limitation. In addition, representations of components of a ceiling raceway system are illustrated in figures so as to indicate interaction of such components.

As such, the relative size of a numbered element of such a component to the component itself and the relative dimensions of height, length, and width within a component and between components are not necessarily to scale. Accordingly, sizes of, distances between, and relative proportions of elements and components of the system, along with particular quantities thereof, are illustrated by way of example and not by way of limitation unless specifically stated otherwise in the Detailed Description and/or the Claims of the present disclosure.

Figure 1C:
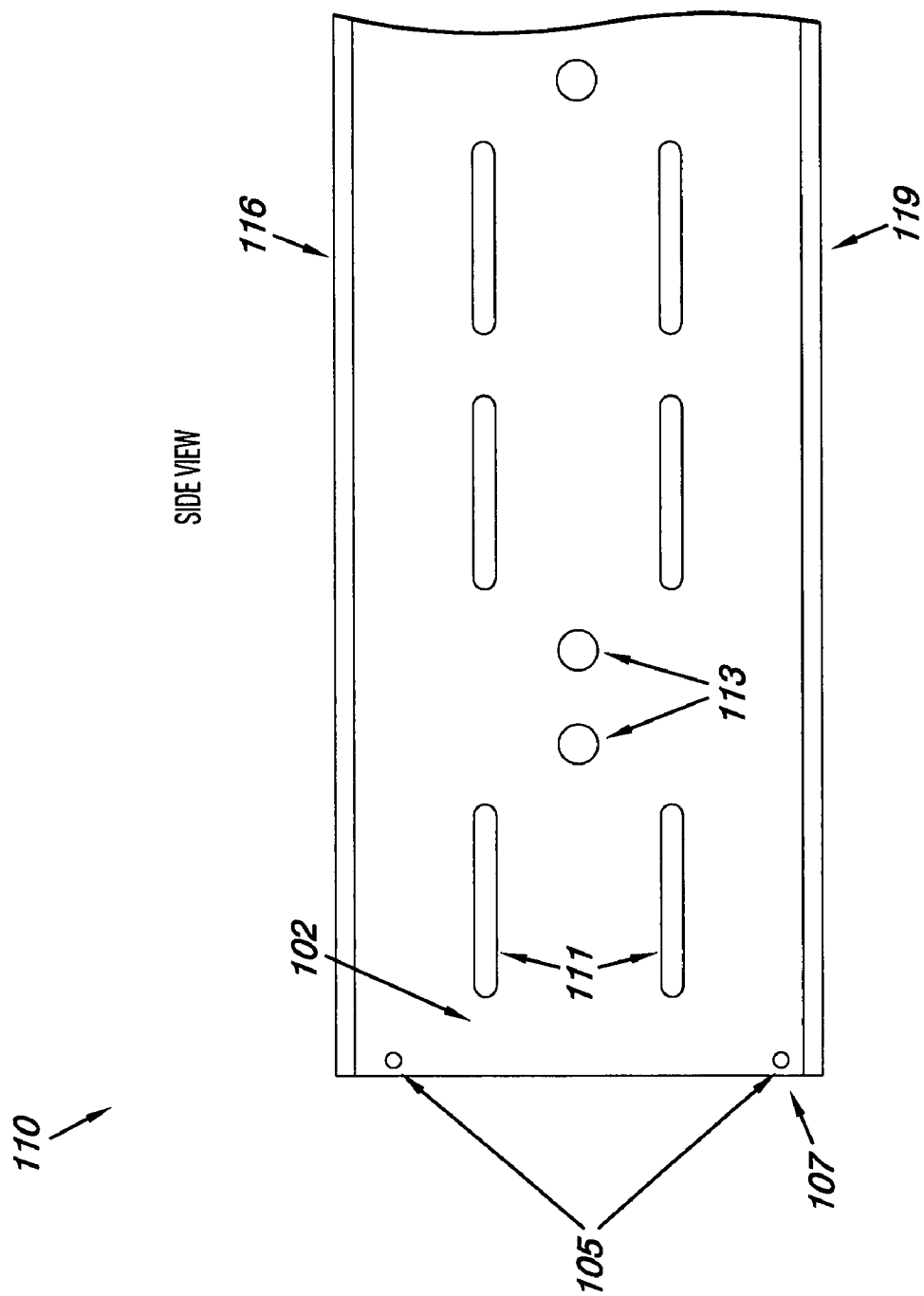

The embodiment illustrated in FIG. 1C shows a side view that includes a portion of a complete section of an enclosable compartment 110, such as the enclosable compartment 101 illustrated in FIG. 1B. The side view of the embodiment illustrated in FIG. 1C shows the enclosable compartment 110 as including a side surface 102, a flange 116 extending coplanar from the top surface 122 (as shown in FIG. 1B), and a flange 119 extending coplanar from the bottom hinged surface 132 (as illustrated in FIG. 1B).

As further illustrated in FIG. 1C, the side surface 102 of the enclosable compartment 110 can include a number of perforations. The perforations can, in various embodiments, include holes 105, 113, and slots 111, among other shapes of perforations. A variable number of holes 105 near the end 107 of the side surface 102 of the enclosable compartment 110 can, in various embodiments, be used for coupling together enclosable compartments (see FIG. 3), connecting an end cap to an enclosable compartment (see FIG. 4), and/or coupling together a plurality of enclosable compartments (see FIGS. 5A-5C).

In various embodiments, perforations on both side surfaces of the enclosable compartment 110, such as the slots 111 in the side surface 102 illustrated in FIG. 1C, can be used to facilitate ingress and egress of cabling, and allow access of other entities, to the interior of the enclosable compartment 110. Perforations on either side surface, such as the slots 111 in the side surface 102 illustrated in FIG. 1C can be used as the ingress and egress for cables, among other uses, to be utilized in vicinities where such cabling does not protrude from an end of the enclosable compartment 110 and/or extend in a direction other than that of the length of the enclosable compartment 110. The holes 113 in the side surface 102 illustrated in FIG. 1C can serve as pipe knockouts and/or be used to provide an attachment site for conduits, among other uses. In some embodiments, the slots 111 and/or holes 113 can have edges that are knurled to reduce abrasion on insulation of cabling and other items transiting the slots 111 and/or holes 113. The number, size, and positioning of the holes 105, 113 and slots 111 in side surface 102 illustrated in FIG. 1C are shown by way of example and not by way of limitation.

Figure 1D:
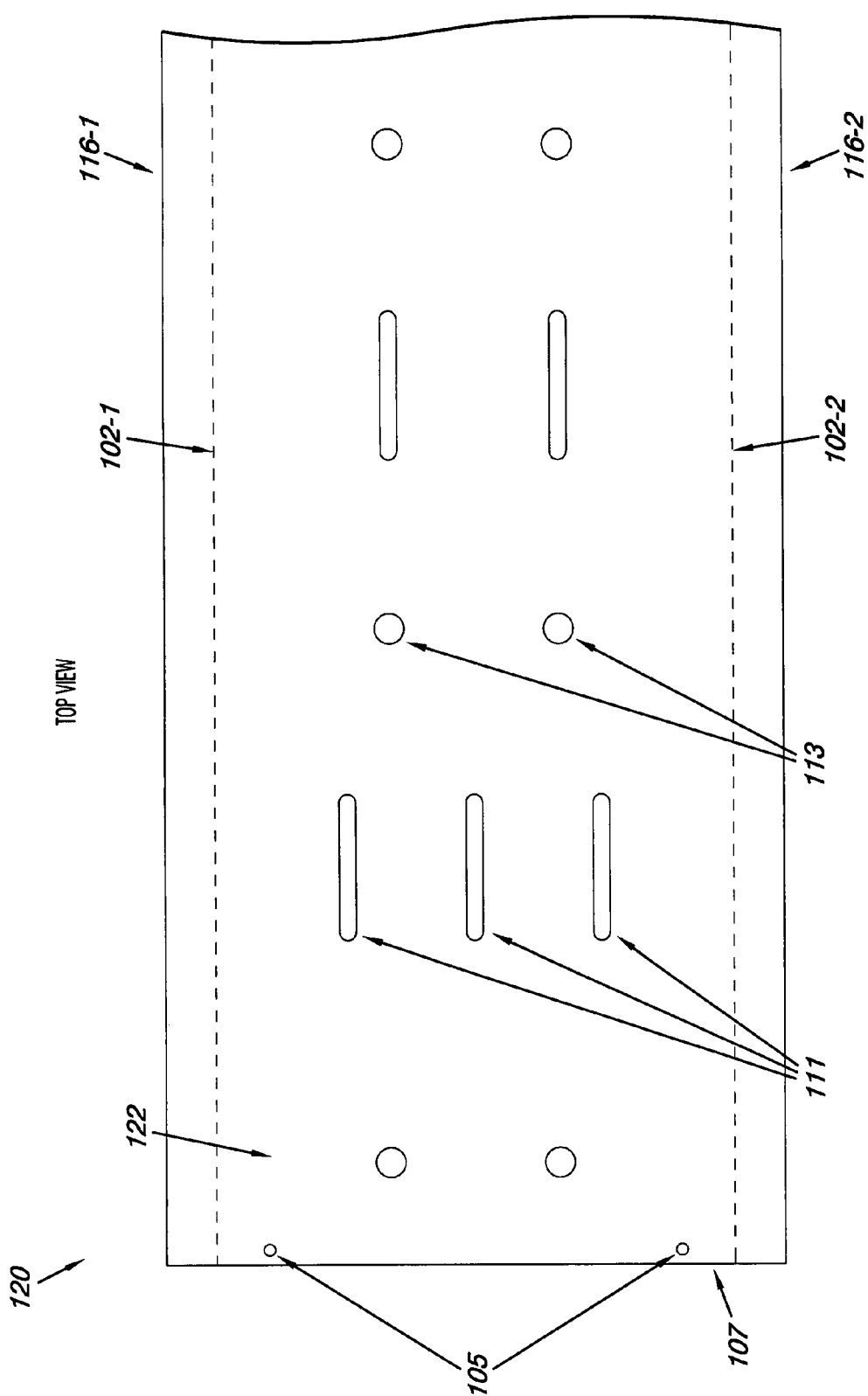
Figure 2:
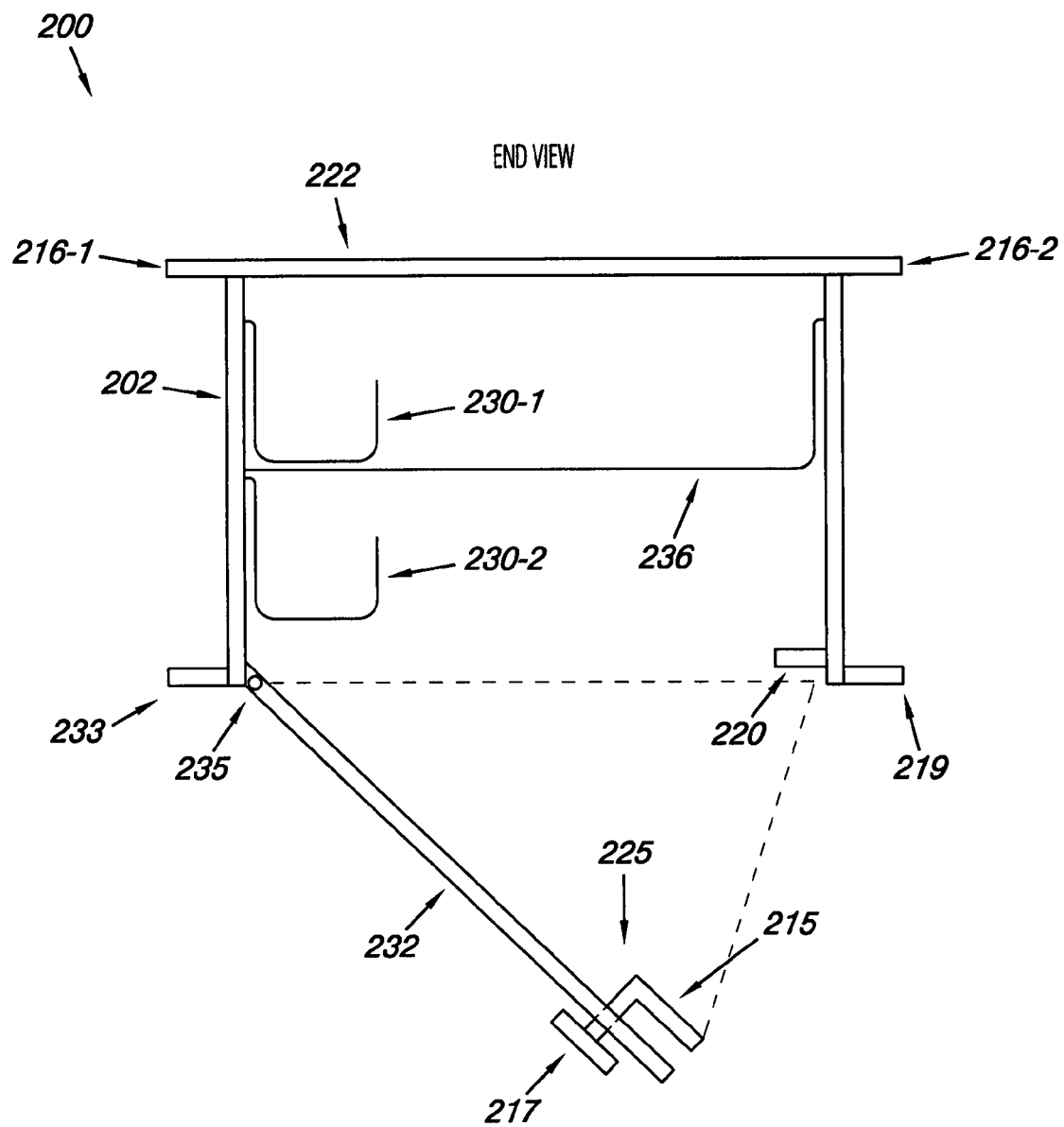
FIG. 2 illustrates an example of an enclosable compartment of a ceiling raceway, such as the enclosable compartment of FIGS. 1A-D, shown from an end view according to an embodiment of the present disclosure.

The embodiment illustrated in FIG. 1D shows a top view that includes a portion of a complete section of an enclosable compartment 120, such as the enclosable compartment 101 illustrated in FIG. 1B and the enclosable compartment 110 illustrated in FIG. 1C. The top view of the embodiment illustrated in FIG. 1D shows the enclosable compartment 120 as including a top surface 122 with a first flange 116-1 extending coplanar from the top surface 122 beyond a first side surface 102-1 (as illustrated in FIGS. 1B, 2, and 7), and a second flange 116-2 extending coplanar from the top surface 122 beyond a second side surface 102-2 (as also illustrated in FIGS. 1B, 2, and 7).

As further illustrated in FIG. 1D, the top surface 122 of the enclosable compartment 120 can include a number of perforations. The perforations can include holes 105, 113, and slots 111, among other shapes of perforations, that can, in various embodiments, be the same as or differ from the size, shape and quantity of the holes and slots illustrated in FIG. 1C. A variable number of holes 105 near the end 107 of the top surface 122 of the enclosable compartment 120 can, in various embodiments, be used for coupling together enclosable compartments (see FIG. 3), connecting an end cap to an enclosable compartment (see FIG. 4), and/or coupling together a plurality of enclosable compartments (see FIGS. 5A-5C).

In various embodiments, perforations of the top surface of the enclosable compartment 120, such as the slots 111 and holes 113 in the top surface 122 illustrated in FIG. 1D, can be used to facilitate ingress and egress of cabling, and allow access of other entities, to the interior of the enclosable compartment 120. Perforations on either side surface, such as the slots 111 in the side surface 102 illustrated in FIG. 1D can be used as the ingress and egress for cables, among other uses, to be utilized in vicinities where such cabling does not protrude from an end of the enclosable compartment 120 and/or extend in a direction other than that of the length of the enclosable compartment 120. The holes 113 in the side surface 102 illustrated in FIG. 1D can serve as pipe knock-outs and/or be used to provide an attachment site for conduits, among other uses. In some embodiments, the slots 111 and/or holes 113 can have edges that are knurled to reduce abrasion on insulation of cabling and other items transiting the slots 111 and/or holes 113. The number, size, and positioning of the holes 105, 113 and slots 111 in the top surface 122 illustrated in FIG. 1D are shown by way of example and not by way of limitation.

The enclosable compartments 110, 120 illustrated in FIGS. 1C-1D can include a number of actual and/or potential perforations. The actual and/or potential perforations can include holes and/or slots, among other shapes of perforations, which can, in various embodiments, be the same as or differ from the size, shape and quantity of the holes and slots illustrated in FIGS. 1C-1D. A variable number of holes 105 near the end 107 of the enclosable compartment can, in some embodiments, be used for coupling together the surfaces of more than one enclosable compartment.

In various embodiments, the potential perforations of the enclosable compartments 110, 120 (not shown) can be knock-out areas used to enable a number of cables to have ingress and/or egress from the enclosable compartments 110, 120. As such, the surfaces can have a knock-out area that is removable to serve as a conduit permitting cable access to an interior of the enclosable compartment from the side surfaces 102 and/or the top surface 122 of the enclosable compartments 110, 120. For example, removing material from a knock-out area can convert a potential perforation to an actual perforation, or a conduit, of the enclosable compartment 110, 120 through which low voltage electrical power supply cables and/or electronic signaling cables can egress from and/or ingress to the enclosable compartment 110, 120 housing a number of such cables.

In some embodiments, the conduit caused by removal of material from a slot 111 and/or hole 113 can have a shaped component (not shown) attached thereto to direct the cabling, for example, in a preferred direction. The number, size, and positioning of the holes 105, 113 and slots 111 in the surfaces 102, 122 illustrated in FIGS. 1C-1D are shown by way of example and not by way of limitation.

Figure 1E:
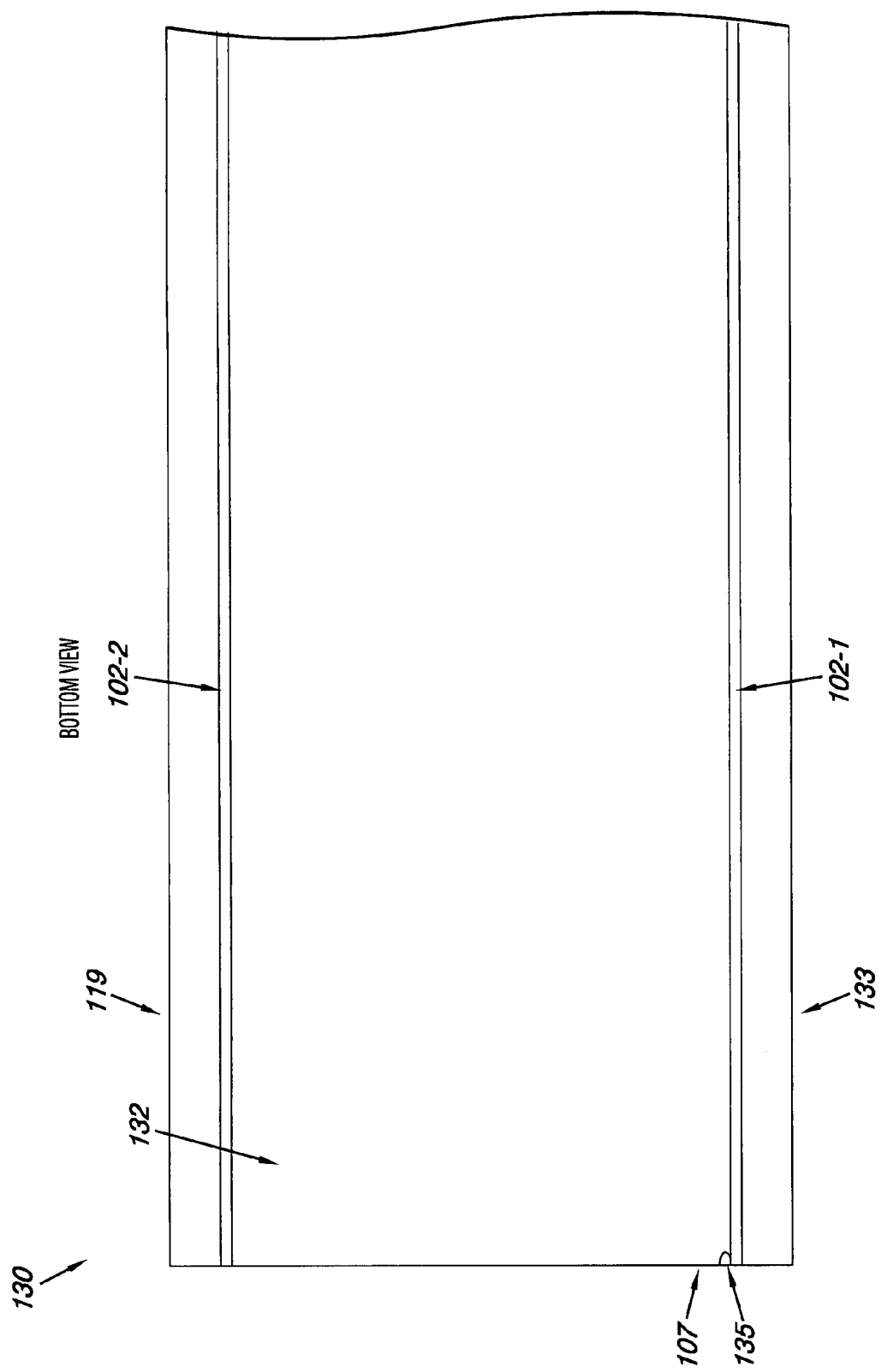

The embodiment illustrated in FIG. 1E shows a bottom view that includes a portion of a complete section of an enclosable compartment 130, such as the enclosable compartment 101 illustrated in FIG. 1B, the enclosable compartment 110 illustrated in FIG. 1C, and the enclosable compartment 120 illustrated in FIG. 1D. The bottom view of the embodiment illustrated in FIG. 1E shows the enclosable compartment 130 as including a bottom hinged surface 132 with a first flange 133 extending coplanar from the bottom hinged surface 132 beyond the first side surface 102-1 (as illustrated in FIGS. 1B, 2, and 7), and a second flange 119 extending coplanar from the bottom hinged surface 132 beyond a second side surface 102-2 (as also illustrated in FIGS. 1B, 2, and 7). In some embodiments of the two side surfaces connecting the top surface to the bottom hinged surface, all such surfaces can be substantially equal in length to form the enclosable compartment.

Figure 3:
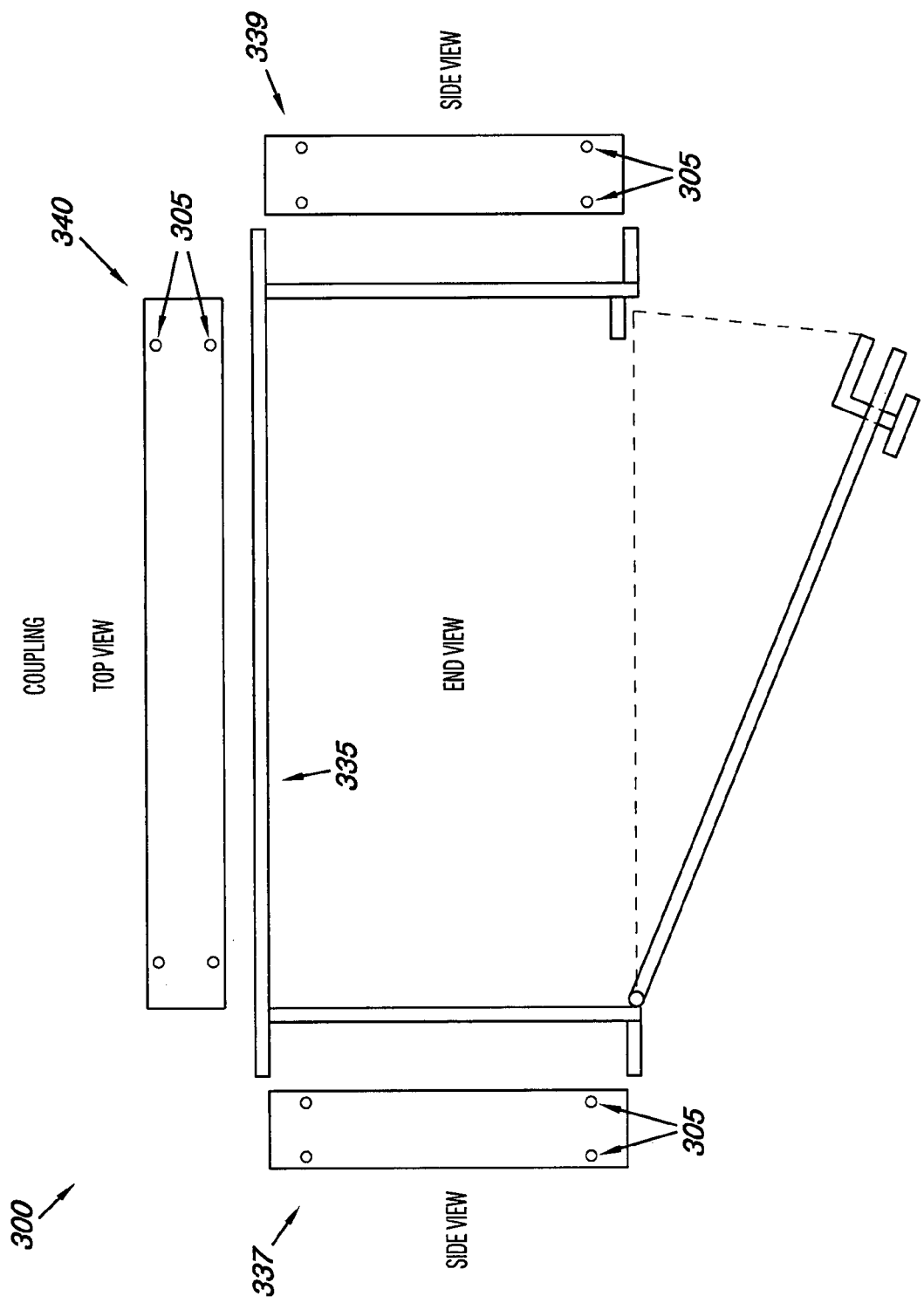
FIG. 3 illustrates an example of components for coupling sections of a ceiling raceway according to an embodiment of the present disclosure.

The embodiment of the bottom hinged surface 132 illustrated in FIG. 1E shows a representation of a hinge device 135 associated with an end 107 of the enclosable compartment 130. One or more hinge devices, in various embodiments, can enable unobstructed access to an interior of the enclosable compartment 130 by allowing the bottom hinged surface 132 to be pivoted, for example, from a closed position to an open position (as illustrated in FIGS. 2, 3, and 7). In various embodiments, the hinge device 135 can connect the bottom hinged surface 132 to a bottom of a side surface, for example, side surface 102-1 (as illustrated in FIGS. 2, 3, and 7), and/or the hinge device 135 can connect the bottom hinged surface 132 to an adjacent flange, for example, flange 133 (not shown).

FIG. 2 illustrates an example of an enclosable compartment of a ceiling raceway, such as the enclosable compartment of FIGS. 1A-1E, shown from an end view according to an embodiment of the present disclosure. The end view of the embodiment illustrated in FIG. 2 shows the enclosable compartment 200 as including a top surface 222 having a set of two flanges 216-1, 216-2 that extend beyond the two side surfaces (e.g., side surface 202), with the set of two flanges 216-1, 216-2 being coplanar with the top surface 222 of the enclosable compartment 200.

The embodiment illustrated in FIG. 2 shows the bottom hinged surface 232 of the enclosable compartment 200 as including a hinge device 235 that, in various embodiments, can be attached to a side surface (e.g., side surface 202) and/or a flange (e.g., flange 233). The bottom hinged surface 232 in FIG. 2 includes a set of two flanges 219, 233 that extend beyond the two side surfaces (e.g., side surface 202), with the set of two flanges 219, 233 being coplanar with the bottom hinged surface 232 in a closed position and with the bottom hinged surface 232 being configured to be substantially flush, when in the closed position, with the lower surface of the drop ceiling (as illustrated in FIG. 7).

The bottom hinged surface 232 of the enclosable compartment 200 illustrated in FIG. 2 is shown in a partially open position 225 with dotted lines indicative of pivoting to the closed position. In some embodiments, the bottom hinged surface 232 can be freely pivoted to a number of fully open positions, which can include hanging substantially perpendicular to the set of two flanges 219, 233, to enable unobstructed access by operators/users to the interior of the enclosable compartment 200.

In various embodiments, a latching device can enable securing the bottom hinged surface in the closed position. The illustration in FIG. 2 shows, for example, the latching device to have a latch 215 that can be turned with a handle 217 controlled by user to engage a catch 220 to secure the bottom hinged surface 232 in the closed position or to disengage the catch 220 to pivot, for example, the bottom hinged surface 232 to the open position.

The enclosable compartment 200 illustrated in FIG. 2 shows that an interior can have a number of cable guides attached therein. The embodiment illustrated in FIG. 2 shows a pair of cable hooks 230-1, 230-2 attached to side surface 202 in addition to a representation of a cable basket 236 that, for example, extends across a width of the enclosable compartment 200. In various embodiments, a cable hook (e.g., cable hook 230-1) and/or a cable basket (e.g., cable basket 236) can be attached to one or both side surfaces and/or the top surface (e.g., side surface 202, and top surface 222) by engaging slots and/or holes (not shown) with, for example, hooks, clamps, and the like, extending from an appropriate location of the cable hook and/or cable basket. By way of example and not by way of limitation, hooks can include universal hooks, J hooks with a horizontal portion protruding from the top to be inserted in a hole, S hooks, among others. In some embodiments, hooks and/or clamps can be welded to one or both side surfaces and/or the top surface (e.g., side surface 202, and top surface 222).

Figure 4:
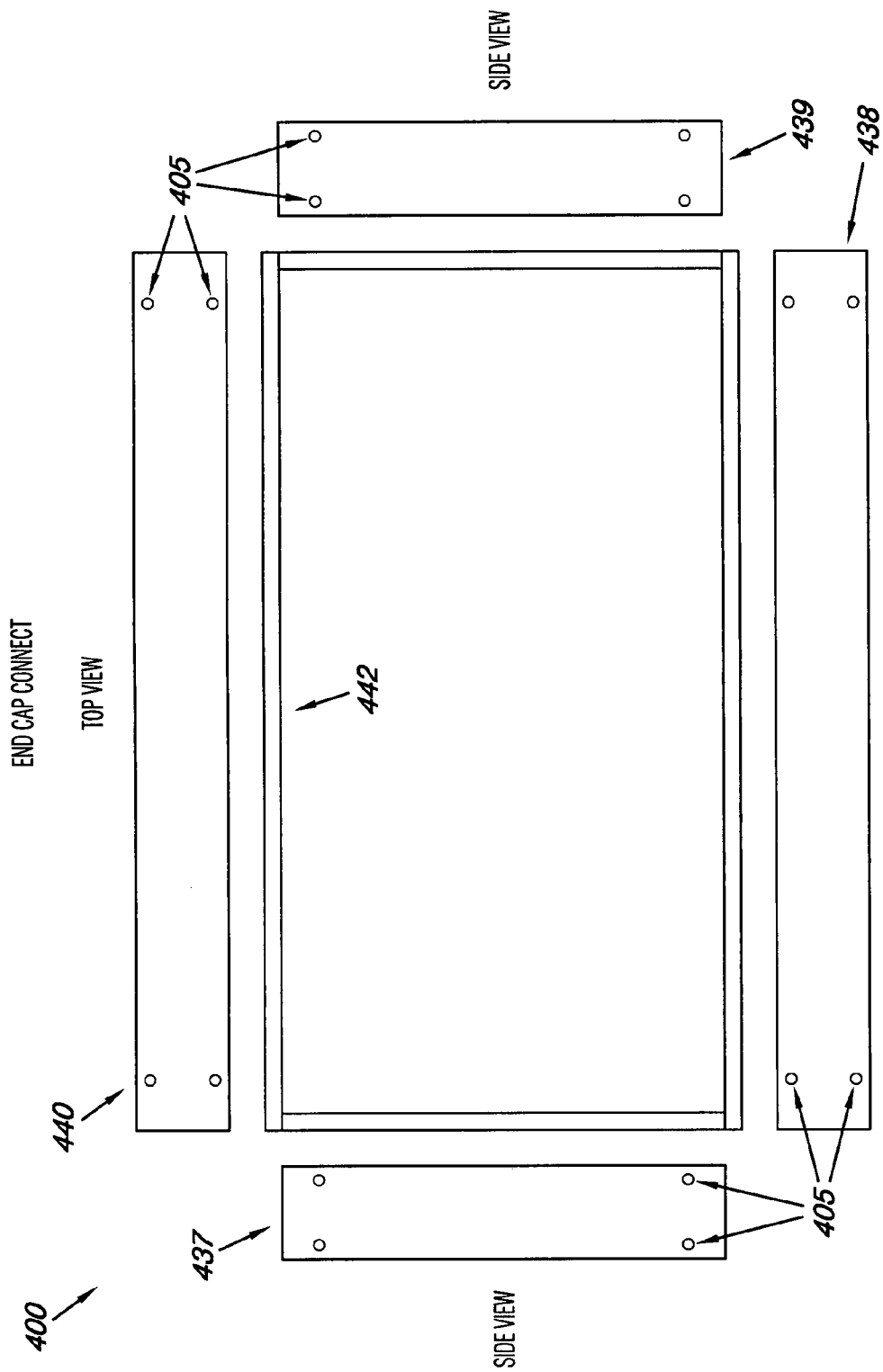
FIG. 4 illustrates an example of coupling an end cap of a ceiling raceway according to an embodiment of the present disclosure.

FIG. 3 illustrates an example of components for coupling sections of a ceiling raceway according to an embodiment of the present disclosure. The end view of the embodiment illustrated in FIG. 3 shows the enclosable compartment 300 as a section of a ceiling raceway that can be coupled to one or more other sections of the ceiling raceway. The enclosable compartment section 300 can have an end 335 that includes holes, for example, in the side surfaces and the top surface (as illustrated in FIGS. 1C-1D as holes 105 near end 107). Such holes can be used for attaching coupling members (e.g., using screws, lines, rivets, and the like) capable of connecting one section of enclosable compartment to another section of enclosable compartment and/or an end cap (as illustrated in FIG. 4). In some embodiments, the bottom hinged surface of an enclosable compartment (as illustrated in FIG. 1E) can include holes for using one or more coupling members to connect one bottom hinged surface to another bottom hinged surface.

FIG. 3 illustrates embodiments of coupling members usable in connecting sections of enclosable compartments and/or connecting an end cap thereto (as illustrated in FIG. 4). For example, coupling members 337, 339 can represent side views of coupling members having holes 305 therein that can correspond to the location of holes in a side surface (as illustrated by holes 105 in FIG. 1C). Similarly, coupling member 340 can represent a top view of a coupling member having holes 305 therein that can correspond to the location of holes in a top surface (as illustrated by holes 105 in FIG. 1D).

A section of enclosable compartment can be coupled to another section of enclosable compartment to contribute to forming a ceiling raceway by linking one coupling member (e.g., using screws, lines, rivets, and the like) to, for example, two side surfaces on contiguous enclosable compartments. In some embodiments, coupling of one section of enclosable compartment to another section of enclosable compartment can be accomplished by connecting the two sections of enclosable compartments with, for example, an inverted U-shaped single-piece coupling inside the two sections. As appreciated by one of ordinary skill in the relevant art, sections of enclosable compartments can be coupled in a variety of ways and remain consistent with the present disclosure. As such, contiguous top surfaces, side surfaces and, in some embodiments, bottom surfaces can be coupled to contribute to forming a ceiling raceway.

FIG. 4 illustrates an example of coupling an end cap of a ceiling raceway according to an embodiment of the present disclosure. An end view of capping an enclosable compartment 400 illustrated in FIG. 4 includes an end cap 442 that can be used to enclose an end of an enclosable compartment and, thus, a section of a ceiling raceway. For example, coupling members 437, 439 can represent side views of coupling members having holes 405 therein that can correspond to the location of holes in a side surface (as illustrated by holes 105 in FIG. 1C). Similarly, coupling member 440 can represent a top view of a coupling member having holes 405 therein that can correspond to the location of holes in a top surface (as illustrated by holes 105 in FIG. 1D). In some embodiments, the coupling member 438 can represent a bottom view of a coupling member having holes 405 therein that correspond to a location of holes in a bottom surface of an enclosable compartment that does not include a hinged surface (not shown).

Figure 5A:
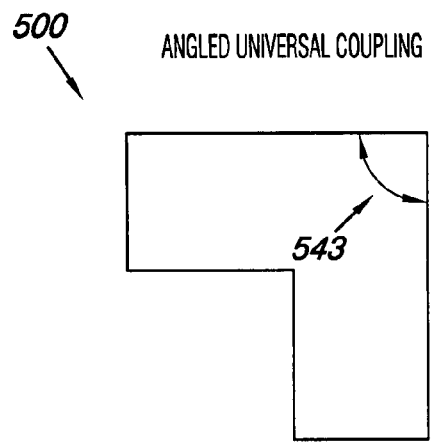
FIGS. 5A-5C illustrate examples of angular coupling of two or more sections of a ceiling raceway according to an embodiment of the present disclosure.
Figure 5B:
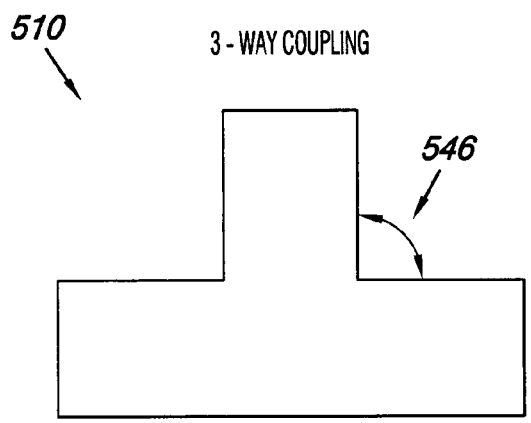
Figure 5C:
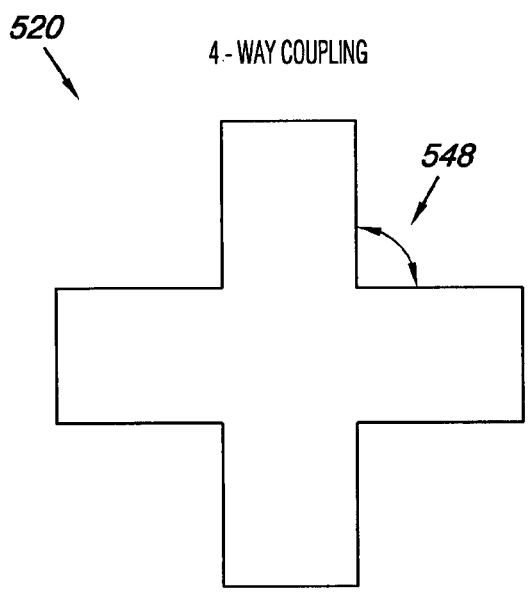

FIGS. 5A-5C illustrate examples of angular coupling of two or more sections of a ceiling raceway according to an embodiment of the present disclosure. Coupling components, or segments, as illustrated in FIGS. 5A-5C can be used for connecting two or more enclosable compartments that are not to be connected linearly. That is, at least one enclosable compartment can be connected at an angle relative to another enclosable compartment (e.g., to enable housing cable in a ceiling raceway turning a corner).

In some embodiments, the coupling segments can connect enclosable compartments by a first end fitting within or over (e.g., like a sleeve) a first enclosable compartment and a second end fitting within or over a second enclosable compartment. In some embodiments, coupling segments can be utilized with holes (e.g., as illustrated with coupling members in FIGS. 3 and 4) and/or without holes (e.g., as illustrated in FIGS. 5A-5C) to connect two or more enclosable compartments. As appreciated by one of ordinary skill in the relevant art, coupling segments can be connected to enclosable compartments in a variety of ways and remain consistent with the present disclosure.

The embodiment illustrated in FIG. 5A shows an example of an angled universal coupling segment 500. Coupling in this configuration is conventionally termed "universal" to account for an ability to connect one section traversing a right turn, a left turn, a vertical turn, a downward turn, or any direction between these cardinal directions, relative to another section. As illustrated in FIG. 5A, the angle 543 of the change in direction between the two ends of the angled universal coupling segment 500 is shown as a right angle (i.e., 90 degrees). However, in various embodiments, the angled universal coupling segment 500 can have an angle 543 suitable for any intended implementation in a ceiling raceway.

The embodiment illustrated in FIG. 5B shows an example of a three-way (3-way) coupling segment 510. Coupling in this configuration can include an ability to connect one section of an enclosable compartment to a second section of an enclosable compartment (e.g., extending linear to the first section) and also an ability to connect a third section of enclosable compartment at an angle to the first and second enclosable compartments. As illustrated in FIG. 5B, the angle 546 of the change in direction between the three ends of the 3-way coupling segment 510 is shown as a right angle. However, in various embodiments, the 3-way coupling segment 500 can have up to three different angles suitable for any intended implementation in a ceiling raceway.

The embodiment illustrated in FIG. 5C shows an example of a four-way (4-way) coupling segment 520. Coupling in this configuration can include an ability to connect one section of an enclosable compartment to a second section of an enclosable compartment (e.g., extending linear to the first section), an ability to connect a third section of enclosable compartment at an angle to the first and second enclosable compartments, and also an ability to connect a fourth section of enclosable compartment at an angle that is the same or different from the angle of the third enclosable compartment. As illustrated in FIG. 5C, the angle 548 of the change in direction between the four ends of the 4-way coupling segment 520 is shown as a right angle. However, in various embodiments, the 4-way coupling segment 520 can have up to four different angles suitable for any intended implementation in a ceiling raceway.

As such, the present disclosure describes using a number of embodiments for coupling segments that can be used to join adjacent enclosable compartments. Coupling segments described include an angled coupling segment for joining two enclosable compartments, a 3-way coupling segment for joining three enclosable compartments, and a 4-way coupling segment for joining four enclosable compartments. As appreciated by one of ordinary skill in the relevant art, other configurations for coupling segments can be substituted that remain consistent with the teachings of the present disclosure.

Figure 6A:
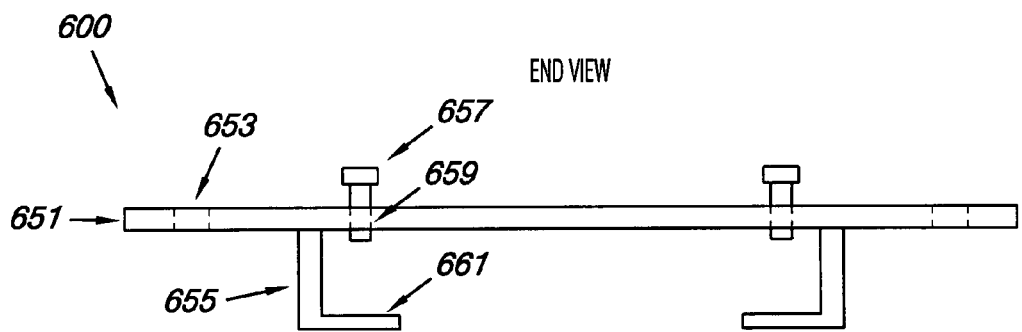
FIGS. 6A-6D illustrate an example of a mounting plate for a ceiling raceway system shown from various viewpoints according to an embodiment of the present disclosure.

FIGS. 6A-6D illustrate an example of a mounting plate for a ceiling raceway system shown from various viewpoints according to an embodiment of the present disclosure. The embodiment illustrated in FIG. 6A shows an end view of a mounting plate 600 having numbered parts associated with a left side 651 of a planar component that can, in some embodiments, be the same as unnumbered parts associated with a right side of the planar component (as similarly illustrated in FIGS. 6B-6C). However, in some embodiments, the parts associated each side of the mounting plate 600 can differ in some respects, depending on differing and/or additional functions performed by each side in particular situations.

Figure 7:
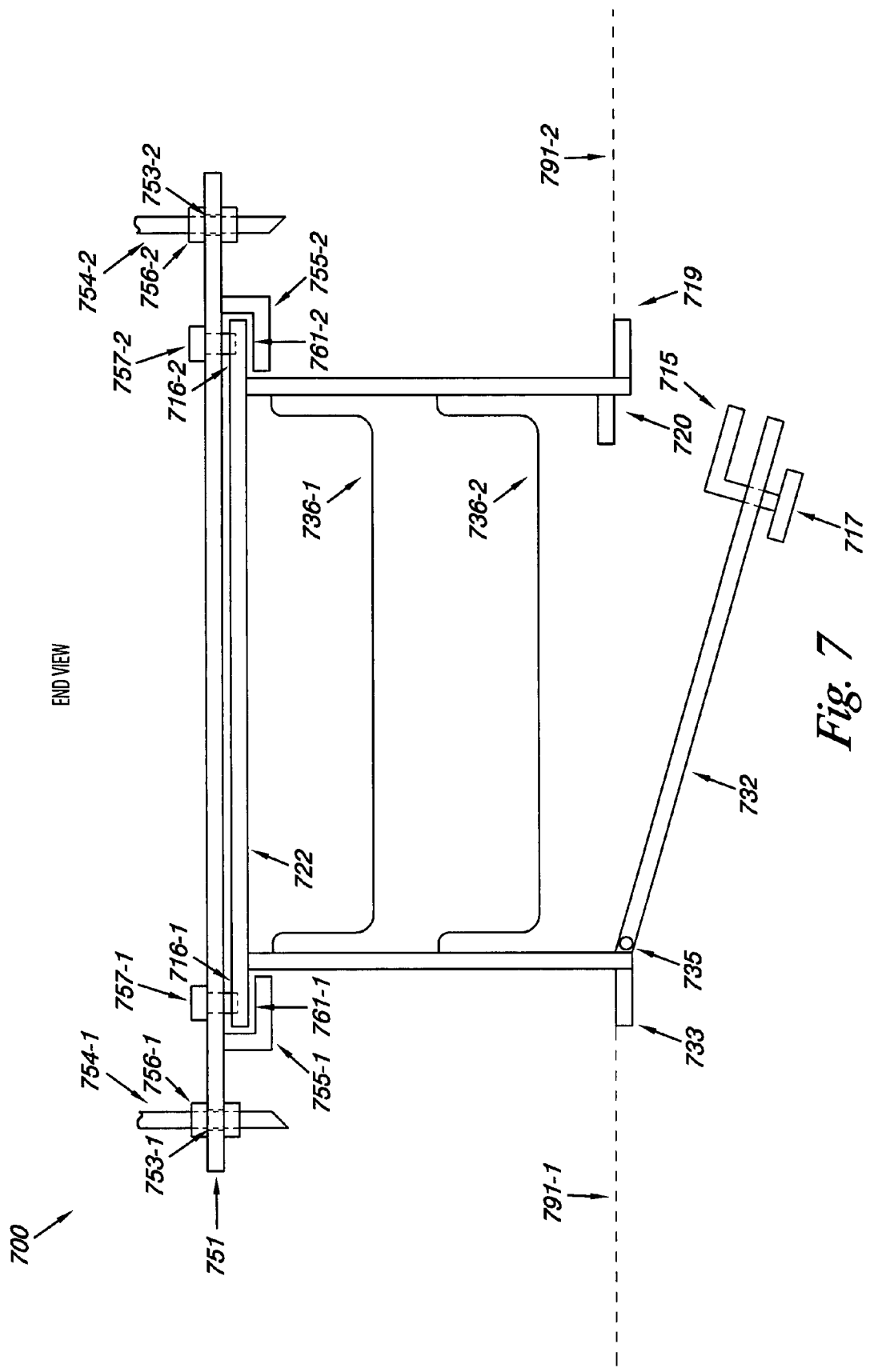
FIG. 7 illustrates an example of an end view of a ceiling raceway system according to an embodiment of the present disclosure.

The embodiment illustrated in FIG. 6A shows a mounting plate 600 in which the left side 651 of the planar component includes a mounting aperture 653 that can, in various embodiments, represent using a number of first apertures to enable attaching the mounting plate 600 to a number of fixed rods, which in some embodiments can be threaded, projecting from a floor structure located above the lower surface of the drop ceiling (as illustrated in FIG. 7). In some embodiments, for example when a mounting plate is to be attached to a ceiling at the top of a structure, such apertures (e.g., mounting aperture 653) can enable attaching to fixed rods, for example, formed in a floor structure above the drop ceiling, a mounting plate above an upper surface of the drop ceiling, where the fixed rods project from a floor structure located above the lower surface of the drop ceiling.

An embodiment of a receiving track 655 is illustrated in FIG. 6A as pending from the left side 651 of the planar component of the mounting plate 600. In some embodiments, two receiving tracks (as illustrated in FIG. 6A) can enable the top surface of an enclosable compartment having a set of two flanges extending beyond the two side surfaces to channel within the two receiving tracks of the mounting plate, where the set of two flanges can be coplanar with the top surface (as illustrated in FIG. 7). Various embodiments of the present disclosure can include any number of receiving tracks associated with one or more mounting plates and the receiving tracks can be positioned in any manner thereon.

As shown above the receiving track 655 illustrated in FIG. 6A, a lock set screw 657 is inserted into a second aperture 659 (e.g., a threaded aperture). In some embodiments, each of the two receiving tracks can be paired with a lock set screw inserted into an aperture above a top horizontal surface 661 of each of the two receiving tracks (as illustrated in FIG. 6A). Various embodiments of the present disclosure can include using any number of second apertures with any number of associated lock set screws to enable securing an enclosable compartment against slidable movement along the receiving tracks of the mounting plate.

Figure 6B:
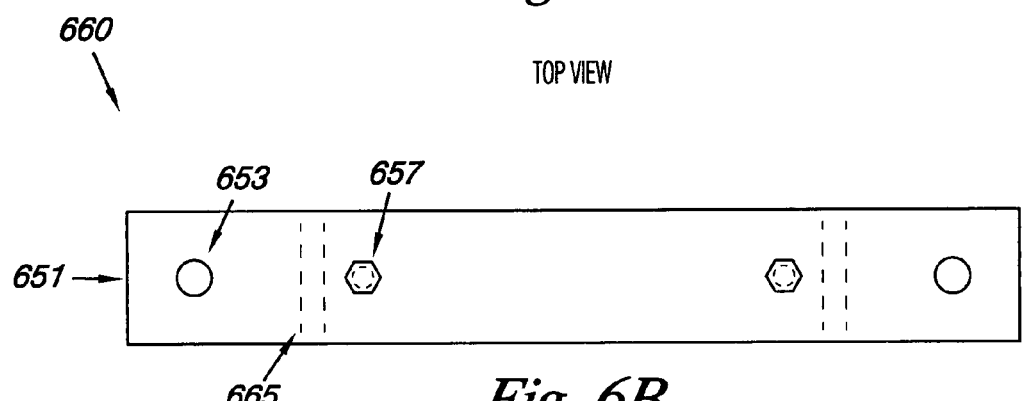

The embodiment illustrated in FIG. 6B shows a top view of a mounting plate 660 having numbered parts associated with a left side 651 of a planar component that can, in some embodiments, be the same as the numbered parts associated with the left side of the planar component illustrated in FIG. 6A. In some embodiments, a first aperture 653 can be positioned adjacent to, and approximately equidistant from each side of, a left side 651 of the planar component of the mounting plate 660. A lock set screw 657, along with its second aperture (not shown), can be centrally positioned relative to the first aperture 653 and an attachment of a receiving track 665 to the mounting plate 660. Various embodiments of the present disclosure can include any positioning of any number of first apertures relative to any number of receiving tracks associated with one or more lock set screws and second apertures.

Figure 6C:
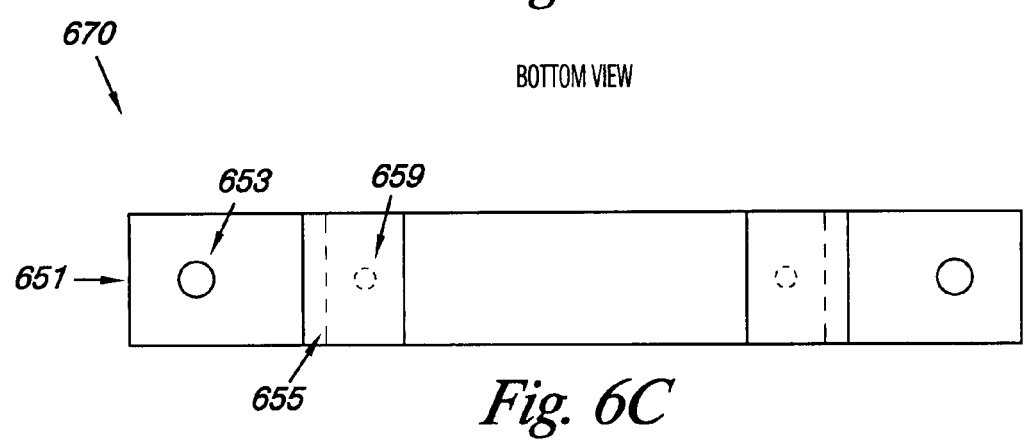

The embodiment illustrated in FIG. 6C shows a bottom view of a mounting plate 670 having numbered parts associated with a left side 651 of a planar component that can, in some embodiments, be the same as the numbered parts associated with the left side of the planar components illustrated in FIGS. 6A-6B. As just described above, in some embodiments, the first aperture 653 can be positioned adjacent to, and approximately equidistant from each side of, a left side 651 of the planar component of the mounting plate 670. The second aperture 659 can, in some embodiments, be centrally positioned relative to the top horizontal surface (not shown) of the receiving track 665 of the mounting plate 670. As also stated above, various embodiments of the present disclosure can include any positioning of any number of first apertures relative to any number of receiving tracks associated with one or more lock set screws and second apertures.

Figure 6D:
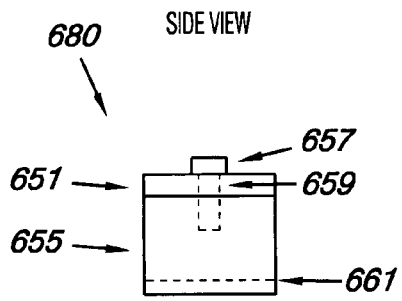

The embodiment illustrated in FIG. 6D shows a side view of a mounting plate 680 having numbered parts associated with a side of a planar component 651 that can, in some embodiments, be the same as the numbered parts associated with the left side of the planar components illustrated in FIGS. 6A-6C. The receiving track 655 depending from the planar component 651 can, in some embodiments, have a width substantially the same as the width of the planar component 651. The lock set screw 657 illustrated in FIG. 6D is shown as being inserted essentially all the way into the second aperture 659. In the interest of clarity, an exaggerated gap has been left between the end of the lock set screw 657 and the top horizontal surface 661 of the receiving track 655. However, as appreciated by one of ordinary skill in the relevant art, lock set screws and receiving tracks that enable securing an enclosable compartment against slidable movement along the receiving tracks of the mounting plate can utilize a smaller gap between the end of the lock set screw when fully inserted and the top horizontal surface of the receiving track.

FIG. 7 illustrates an example of an end view of a ceiling raceway system according to an embodiment of the present disclosure. The end view of the embodiment illustrated in FIG. 7 shows the ceiling raceway system 700 as integrating the components of an enclosable compartment (as illustrated in the end view of FIG. 2) with the components of a mounting plate (as illustrated in the end view of FIG. 6A).

The embodiment of the ceiling raceway system 700 illustrated in FIG. 7 shows a planar component 751 of a mounting plate associated with two adjustable mounting locks 756-1, 756-2 for adjustably attaching the planar component 751 of the mounting plate to fixed rods 754-1, 754-2 projecting (e.g., from a floor structure located above the mounting plate) through first apertures 753-1, 753-2 of the planar component 751. As described above, two lock set screws 757-1, 757-2, along with their second apertures (not shown), are centrally positioned relative to the first apertures 753-1, 753-2 and the two receiving tracks 755-1, 755-2 to the planar component 751 of the mounting plate.

The embodiment illustrated in FIG. 7 shows that a first set of flanges 716-, 716-2 extending coplanar with the top surface 722 of the enclosable compartment channel within the two receiving tracks 755-1, 755-2 so as to be securable between the ends of a set of lock set screws 757-1, 757-2 and the top horizontal surfaces 761-1, 761-2 of the two receiving tracks 755-1, 755-2. As used in the present disclosure, a combination of the lock set screws 757-1, 757-2 and the receiving tracks 755-1, 755-2 along with the adjustable mounting locks 756-1, 756-2 can be used as a mounting feature for attaching the enclosable compartment to the mounting plate and adjusting the position of the enclosable compartment. As described further below, adjusting the position of the enclosable compartment with adjustable mounting locks can be performed such that a bottom hinged surface 732 of the enclosable compartment is substantially flush with a lower surface of a drop ceiling.

In various embodiments, the ceiling raceway system 700 illustrated in FIG. 7 can include a plurality of sections of the raceway, where at least one section includes a bottom hinged surface extending a length of the enclosable compartment. The embodiment illustrated in FIG. 7 shows that the bottom hinged surface 732 of an enclosable compartment forming at least one section of the ceiling raceway system 700 includes a number of hinge devices 735 to attach the bottom hinged surface 732 to a frame of the section and to enable opening the bottom hinged surface 732 to access an interior of the section.

As illustrated in FIG. 7, a ceiling raceway system 700 can have an enclosable compartment for a number of cables located above a lower surface of a drop ceiling 719-1, 791-2. In the embodiment illustrated in FIG. 7, a first flange 733 located adjacent to the number of hinge devices 735 extends beyond the bottom hinged surface 732 and supports a section of the drop ceiling 791-1 such that the section is substantially flush with the bottom hinged surface 732 in a closed position.

The bottom hinged surface 732 can have a latch device for securing the bottom hinged surface in the closed position. At least one section of the ceiling raceway system 700 can include a second flange 719 located adjacent to the latch device (e.g., a latch device having elements 715, 717, 720, as described with regard to FIG. 2) to enable latching the bottom hinged surface 732 in the closed position such that the bottom hinged surface 732 is substantially flush with a lower surface of the drop ceiling 791-2.

The embodiment of the cable raceway system 700 illustrated in FIG. 7 shows, by way of example and not by way of limitation, an interior of the enclosable compartment including an upper cable basket 736-1 and a lower cable basket 736-2. In general, the interior of the enclosable compartment can have any number of cable guides attachable thereto to provide support for cables traversing a length of the enclosable compartment, with the number of cable guides including any number of cable hooks and cable baskets suitable for accomplishing the intent to the cable raceway system.

Figure 8:
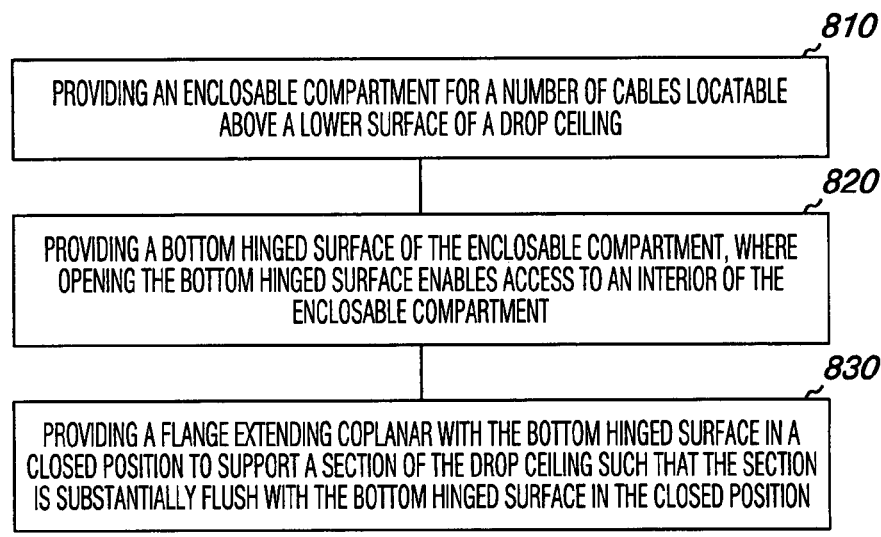
FIG. 8 is a block diagram illustrating a method of forming a ceiling raceway according to an embodiment of the present disclosure.

FIG. 8 is a block diagram illustrating a method of forming a ceiling raceway according to an embodiment of the present disclosure. Unless explicitly stated, method embodiments described herein are not constrained to a particular order or sequence. Additionally, some of the described method embodiments, or elements thereof, can occur or be performed at the same, or at least at substantially the same, point in time.

The embodiment illustrated in FIG. 8 includes providing an enclosable compartment for a number of cables locatable above a lower surface of a drop ceiling, as shown in block 810. The enclosable compartment can, as described above, have top, side, and bottom surfaces have various lengths, widths, and/or heights suitable for the particular situation.

Block 820 of the embodiment illustrated in FIG. 8 shows providing a bottom hinged surface of the enclosable compartment, wherein opening the bottom hinged surface enables access to an interior of the enclosable compartment. In various embodiments, the bottom hinged surface can be accessible to an operator opening the bottom hinged surface for access to the interior of the raceway associated with the drop ceiling. In some embodiments, at least one section of a plurality of sections of the ceiling raceway includes a bottom hinged surface extending a length of the enclosable compartment. In various embodiments, the at least one section can include a number of hinge devices to attach the bottom hinged surface to a frame of the section and to enable opening the bottom hinged surface to access an interior of the section.

As shown in block 830 illustrated in FIG. 8, the embodiment includes providing a flange extending coplanar with the bottom hinged surface in a closed position to support a section of the drop ceiling such that the section is substantially flush with the bottom hinged surface in the closed position. In various embodiments, the at least one section with the bottom hinged surface attached to a frame of the section can include a number of latch devices to enable latching the bottom hinged surface in the closed position such that the bottom hinged surface is substantially flush with a lower surface of the drop ceiling.

Figure 9:
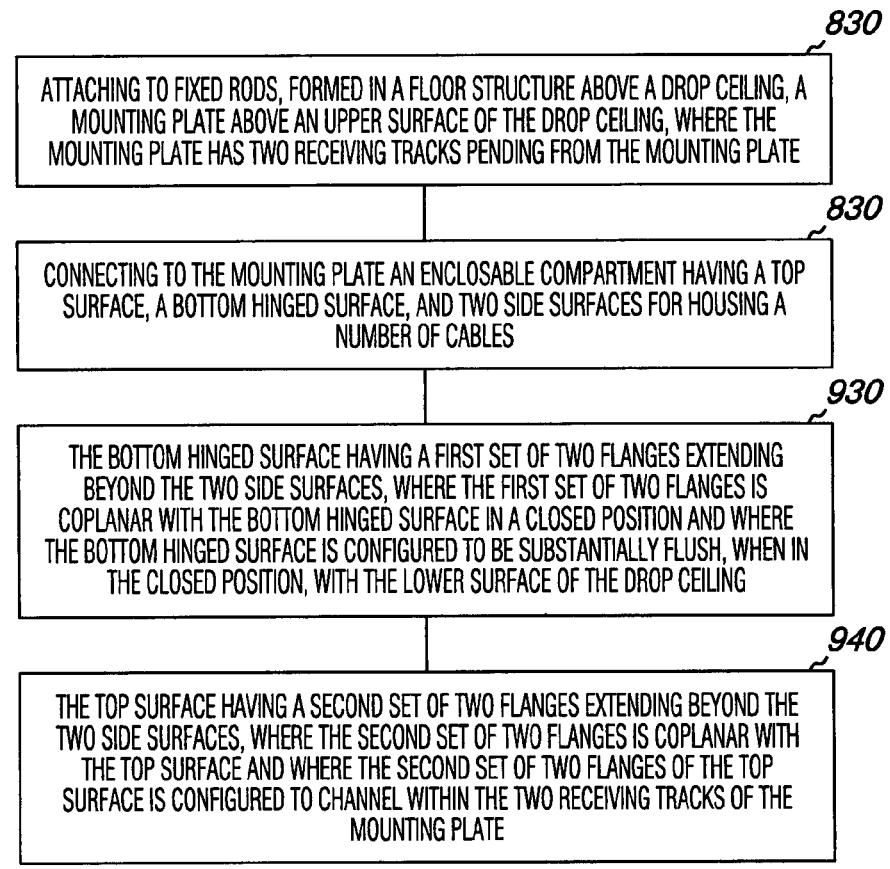
FIG. 9 is a block diagram illustrating a method of forming a ceiling raceway system according to an embodiment of the present disclosure.

FIG. 9 is a block diagram illustrating a method of forming a ceiling raceway system according to an embodiment of the present disclosure. The embodiment illustrated in FIG. 9 includes attaching to fixed rods, formed in either a floor structure or a ceiling structure above a drop ceiling, a mounting plate above an upper surface of a drop ceiling, where the mounting plate has two receiving tracks pending from the mounting plate, as shown in block 910. In some embodiments, the number of fixed rods can project from either the floor or ceiling structure located above the lower surface of the drop ceiling.

Block 920 of the embodiment illustrated in FIG. 9 shows connecting an enclosable compartment having a top surface, a bottom hinged surface, and two side surfaces for housing a number of cables. In some embodiments, a variable number of substantially planar surfaces can be connected to form the enclosable compartment.

As shown in block 930 illustrated in FIG. 9, the embodiment includes the bottom hinged surface having a first set of two flanges extending beyond the two side surfaces, where the first set of two flanges is coplanar with the bottom hinged surface in a closed position and where the bottom hinged surface is configured to be substantially flush, when in the closed position, with the lower surface of the drop ceiling. In various embodiments, mounting the bottom hinged surface of the enclosable compartment enables opening the bottom hinged surface to allow placement of and access to the number of cables in the interior of the enclosable compartment.

In various embodiments, mounting the bottom hinged surface includes mounting the bottom hinged surface in a frame of the enclosable compartment with a number of hinge devices. Mounting the bottom hinged surface in the frame with the number of hinge devices can enable opening the bottom hinged surface to install and service the number of cables in the interior of the enclosable compartment.

As described above, an enclosable compartment for a number of cables can be locatable above a lower surface of a drop ceiling with the bottom hinged surface being substantially flush with the lower surface of the drop ceiling. A bottom hinged surface of the enclosable compartment can enable access to an interior of the enclosable compartment. In some embodiments, the bottom hinged surface can be pivotable approximately ninety degrees to an open position, for example, substantially perpendicular to the lower surface of the drop ceiling. Hence, the bottom hinged surface can be accessible to an operator opening the bottom hinged surface for access to the interior of the raceway associated with the drop ceiling.

Block 940 of the embodiment illustrated in FIG. 9 shows the top surface having a second set of two flanges extending beyond the two side surfaces, where the second set of two flanges is coplanar with the top surface and where the second set of two flanges of the top surface is configured to channel within the two receiving tracks of the mounting plate. In various embodiments, a number of fixed rods projecting from either the floor or ceiling structure located above the lower surface of the drop ceiling can be used for attaching a number of mounting plates to the fixed and pending a number of enclosable compartments from the number of mounting plates. In various embodiments, pending the number of enclosable compartments from the number of mounting plates can be performed using mounting plates having a number of lock set screws and a number of receiving tracks for securing a number of flanges extending from a top surface of the enclosable compartment.

Although specific embodiments have been illustrated and described herein, those of ordinary skill in the art will appreciate that an arrangement calculated to achieve the same results can be substituted for the specific embodiments shown. This disclosure is intended to cover adaptations or variations of various embodiments of the present disclosure. It is to be understood that the above description has been made in an illustrative fashion, and not a restrictive one. Combination of the above embodiments, and other embodiments not specifically described herein will be apparent to those of ordinary skill in the art upon reviewing the above description. The scope of the various embodiments of the present disclosure includes other applications in which the above structures and methods can be used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A ceiling raceway, comprising: an enclosable compartment, having a top surface, a bottom surface, and two side surfaces, for housing a number of cables locatable above a lower surface of a drop ceiling; a bottom hinged surface of the enclosable compartment that forms part of the bottom surface, wherein opening the bottom hinged surface enables access to an interior of the enclosable compartment; a lower flange extending outward from a side surface, wherein the flange is separate from and coplanar with the bottom hinged surface when the bottom hinged surface is in a closed position, to support a section of the drop ceiling such that the section is substantially flush with the bottom hinged surface in the closed position; and a first upper flange, extending beyond a first side surface of the two side surfaces and coplanar with the top surface, and a second upper flange, extending beyond a second side surface of the two side surfaces and coplanar with the top surface, configured to channel within a receiving track of a mounting plate.

2. The method of claim 1, wherein the method includes having the enclosable compartment include the two side surfaces connecting the top surface to the bottom hinged surface, wherein all surfaces are substantially equal in length to form the enclosable compartment.

3. The method of claim 1, wherein the method includes the top surface and the two side surfaces having a number of knock-out areas that are removable to serve as conduits permitting cable ingress to and egress from an interior of the enclosable compartment.

4. The method of claim 1, wherein the method includes an interior of the enclosable compartment having a number of cable guides attachable thereto providing support for cables traversing a length of the enclosable compartment, the number of cable guides including cable hooks and cable baskets.

5. The method of claim 1, wherein the method includes the bottom hinged surface pivoting approximately ninety degrees to an open position substantially perpendicular to the lower surface of the drop ceiling.

6. The method of claim 1, wherein the method includes the bottom hinged surface having a latch for securing the bottom hinged surface in the closed position.

7. The method of claim 1, wherein attaching the mounting plate includes having a mounting feature for attaching the enclosable compartment to the mounting plate and adjusting the position of the enclosable compartment such that the bottom hinged surface thereof is substantially flush with the lower surface of the drop ceiling.

8. The method of claim 7, wherein attaching the mounting plate with the mounting feature includes:
    using a number of first apertures to enable attaching the mounting plate to a number of fixed threaded rods projecting front a floor structure located above the lower surface of the drop ceiling; and
    using a number of second apertures with a number of associated lock set screws to enable securing the enclosable compartment against slidable movement along the receiving tracks of the mounting plate.

9. The method of claim 1, wherein the method includes using coupling segments to join adjacent enclosable compartments, wherein the coupling segments are selected from a group including:
    an angled coupling segment for joining two enclosable compartments;
    a three-way coupling segment for joining three enclosable compartments; and
    a four-way coupling segment for joining four enclosable compartments.

10. A ceiling raceway, comprising:
    an enclosable compartment, having a top surface, a bottom surface, and two side surfaces, for housing a number of cables locatable above a lower surface of a drop ceiling;
    a bottom hinged surface of the enclosable compartment that forms part of the bottom surface, wherein opening the bottom hinged surface enables access to an interior of the enclosable compartment;
    a lower flange extending outward from a side surface, wherein the flange is separate from and coplanar with the bottom hinged surface when the bottom hinged surface is in a closed position, to support a section of the drop ceiling such that the section is substantially flush with the bottom hinged surface in the closed position; and
    an upper flange, extending beyond a side surface and coplanar with the top surface, configured to channel within a receiving track of a mounting plate.

11. The apparatus of claim 10, wherein the bottom hinged surface includes the bottom hinged surface being accessible to an operator opening the bottom hinged surface for access to the interior of the raceway associated with the drop ceiling.

12. The apparatus of claim 10, wherein the ceiling raceway includes a plurality of sections of the raceway, wherein at least one section includes a bottom hinged surface extending a length of the enclosable compartment.

13. The apparatus of claim 12, wherein the at least one section includes a number of hinge devices to attach the bottom hinged surface to a frame of the section and to enable opening the bottom hinged surface to access an interior of the section.

14. The apparatus of claim 12, wherein the at least one section includes a number of latch devices to enable latching the bottom hinged surface in the closed position such that the bottom hinged surface is substantially flush with a lower surface of the drop ceiling.

15. A ceiling raceway system, comprising:
    a mounting plate configured to be positioned above a lower surface of a drop ceiling, the mounting plate having two receiving tracks pending from the mounting plate; and
    an enclosable compartment, having a top surface, a bottom hinged surface, and two side surfaces, for housing a number of cables, wherein the enclosable compartment includes:
        the bottom hinged surface having a first set of two flanges extending beyond the two side surfaces coplanar with the bottom hinged surface in a closed position, wherein the bottom hinged surface is configured to be substantially flush with the lower surface of the drop ceiling when in the closed position; and
        the top surface having a second set of two flanges extending beyond the two side surfaces coplanar with the top surface, wherein the two flanges of the top surface are configured to channel within the two receiving tracks of the mounting plate.

16. The system of claim 15, wherein the enclosable compartment includes the two side surfaces connecting the top surface to the bottom hinged surface, wherein all surfaces are substantially equal in length to form the enclosable compartment.

17. The system of claim 15, wherein the top surface and the two side surfaces include a number of knock-out areas that are removable to serve as conduits to permit cable access to an interior of the enclosable compartment.

18. The system of claim 15, wherein an interior of the enclosable compartment includes a number of cable guides attachable thereto to provide support for cables traversing a length of the enclosable compartment, the number of cable guides including cable hooks and cable baskets.

19. The system of claim 15, wherein the bottom hinged surface is pivotable approximately ninety degrees to an open position substantially perpendicular to the lower surface of the drop ceiling.

20. The system of claim 15, wherein the bottom hinged surface includes a latch to secure the bottom hinged surface in the closed position.

21. The system of claim 15, wherein the mounting plate includes a mounting feature to attach the enclosable compartment to the mounting plate and adjust the position of the enclosable compartment such that the bottom hinged surface thereof is substantially flush with the lower surface of the drop ceiling.

22. The system of claim 21, wherein the mounting feature of the mounting plate includes:
   a number of first apertures to enable attachment of the mounting plate to a number of fixed threaded rods projecting from a floor structure located above the lower surface of the drop ceiling; and
   a number of second apertures to enable a number of associated lock set screws to secure the enclosable compartment against slidable movement along the receiving tracks of the mounting plate.

23. The system of claim 15, wherein the system includes coupling segments to join adjacent enclosable compartments, wherein the coupling segments are selected from a group including:
   an angled coupling segment for joining two enclosable compartments;
   a three-way coupling segment for joining three enclosable compartments; and
   a four-way coupling segment for joining four enclosable compartments.

* * * * *